Aug. 17, 1965
M. L. CRIPE
3,201,177
VACUUM SUSPENDED BOOSTER BRAKE MECHANISM
Filed Sept. 9, 1963
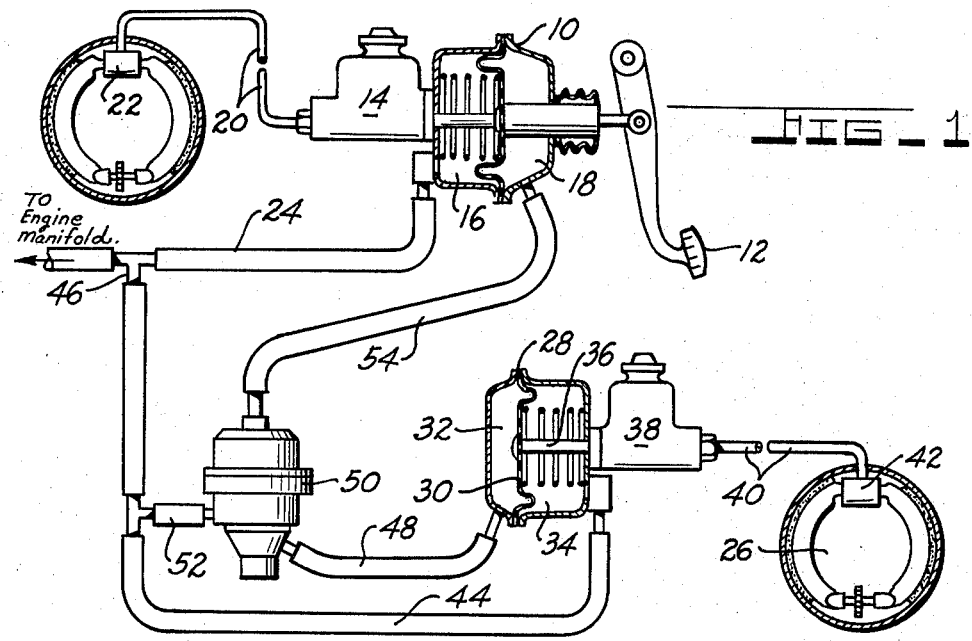
FIG_1
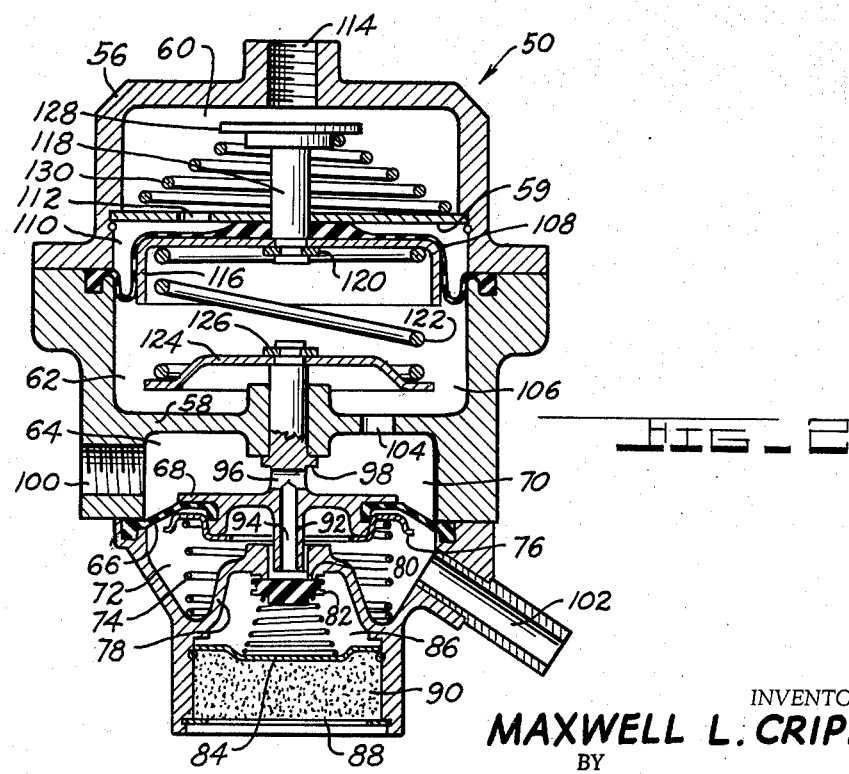
FIG_2
INVENTOR.
MAXWELL L. CRIPE.
BY
ATTORNEY.

United States Patent Office 3,201,177
Patented Aug. 17, 1965

3,201,177
VACUUM SUSPENDED BOOSTER BRAKE
MECHANISM
Maxwell L. Cripe, South Bend, Ind., assignor to The Bendix Corporation, South Bend, Ind., a corporation of Delaware
Filed Sept. 9, 1963, Ser. No. 307,448
3 Claims. (Cl. 303—6)

This invention relates to a control means within the braking system of a vehicle to proportion the amount of braking between front and rear wheels thereof.

In bringing an automotive vehicle to a stop, it is well known that it is the retarding force effected between the tire and the road surface that causes the vehicle to stop. The magnitude of the retarding force is a result of the force holding the wheel against the road surface and the coefficient of the tire on the road surface. It has been determined that the coefficient of friction of the tire on the road surface is at its highest when the tire is just short of braking contact therewith and entering a slide. If the wheel locks and slides there is a reduction of the retarding force and a loss of control. If the rear wheel should lock and slide the vehicle usually goes into a skid, and if the front wheel locks, loss of steering control results. It is, therefore, apparent that the minimum stopping distance as well as the maximum control of the vehicle is obtained when all wheels are retarding the deceleration of the vehicle with a force just below that at which the wheel will lock up under this specific road surface condition.

When a vehicle is at rest, there is a normal load distribution of the vehicle between the front and rear wheels to which the brakes are adjusted in a manner that, under normal conditions, the front and rear wheels of the vehicle will lock up at substantially the same time. However, with the center of gravity of the vehicle being a substantial distance above the road surface, when a vehicle decelerates, there is a couple about the center of gravity that results in a shifting of load distribution to the extent that the force applied downwardly on the front wheels increases and the force applied downwardly on the rear wheels decreases. Under these circumstances the rear wheels tend to lock up and slide more quickly than the front wheels. Therefore, normal brake adjustments are a compromise to the extent that the shift in load distribution is taken into consideration when adjusting the front and rear wheels of a vehicle to compensate for a part of the shift of load distribution so that the front and rear wheels will still lock up at approximately the same time, if lock up is to occur.

With the advent of power brake systems the high braking pressures require less effort, thus making the brake pedal on a vehicle highly sensitive to an operator's force thereon.

As may be fully realized by those skilled in the art to which my invention relates, previous attempts at proportioning the braking forces between the wheels of a vehicle have primarily centered about the use of pendulums and/or devices to sense the proportionate deceleration of the wheels of the vehicle and by comparing same, modulate the brake fluid pressure between the wheels of the vehicle. Little, if any, attempt has, however, been made to provide a vehicle with a split type power braking system having the power fluid communication between two or more power units regulated so as to proportion the power assist applied to one set of vehicle brakes with regard to that applied to the other. This is a principal object of my invention.

It is also an object of my invention to provide a vehicle with two power brake units having a valve device in the power fluid supply of one of said units that is controlled by the control pressure of the other of said units to provide one set of brakes with a diminishing rate of pressure increase as compared to the other set of brakes.

Still another object of my invention is to provide the aforementioned valve with a control means that has a variable rate resilient means biased against a constant rate resilient means controlling a pressure responsive means.

It is a still further object of my invention to provide a vehicle with a vacuum suspended servomotor connected to the front wheel brakes thereof and a separate vacuum suspended servomotor for operating the rear brakes of the vehicle, such that the control chamber of the front wheel vacuum suspended type servomotor is communicated to a valve control mechanism arranged to open or close the vacuum communication with a control chamber of said servomotor controlling the rear brakes of the vehicle with the control means being arranged to varying the rate of increase of control pressure to the rear brake servomotor as regards the control pressure in the front brake servomotor.

A still further object of my invention is to provide a brake system for a vehicle in accordance with the foregoing objects wherein there is provided at least two manually controlled, power operated, brake actuating units with one of said units being responsive to the control of the other of said units to lower the rate of increase of the brake pressure output as regards the increase of brake pressure output of said other unit.

Further objects and advantages of the present invention will be apparent from the following description of the accompanying drawings in which:

FIGURE 1 is a schematic presentation of a vehicle braking system in accordance with the principals of my invention; and FIGURE 2 is a cross sectional view of the proportional control valve in accordance with my invention.

In more detail, FIGURE 1 shows a braking system in accordance with the principles of my invention for use in a vehicle. As schematically shown, I have arranged a fluid pressure servomotor 10 having valve means directly controlled by a brake pedal 12 to, in turn, control a pressure differential across a pressure responsive means within the servomotor 10 that will react on a push rod (not shown) to pressurize the master cylinder 14. The servomotor 10 is divided into two variable volume chambers 16 and 18 by the aforementioned pressure responsive means therein, which pressure responsive means is arranged to mount the valve means aforementioned as may be readily seen in my copending application No. 75,596, filed December 15, 1960, now Patent No. 3,106,873. The master cylinder 14 is connected via a conduit 20 to a wheel cylinder 22 of a front wheel brake.

The servomotor 10 is of the vacuum suspended type having a vacuum connection 24 communicating with an engine manifold of the vehicle (not shown).

For actuating a rear wheel brake 26 I have provided a servomoto 28 having a pressure responsive member 30 therein dividing the housing thereof into two variable volume chambers 32 and 34. Also the pressure responsive member is affixed to a push rod 36 that is adapted to drive a piston (not shown) in the master cylinder 38 whose output is communicated via line 40 to a wheel cylinder 42 in the rear brakes 26.

As seen, the rear variable volume chamber 34 is connected via a conduit 44 to a T 46 leading to the line or conduit 24 communicating with the engine manifold aforementioned.

As for the forward variable volume chamber 32, it is linked by a conduit 48 to a valve means 50 that is also communicated by a conduit 52 to the conduit 44 and by a conduit 54 to the control chamber 18 of the servomotor 10.

As regards the control means 50, attention is directed to FIGURE 2 which shows a cross section of this control. As seen, this control includes a housing 56 having a lower partition 58 and an upper partition 59 therewithin to create essentially three cavities from top to bottom, 60, 62 and 64, respectively. Within the lower cavity 64 I affix a diaphragm 66 to the housing walls and a valve member 68. The diaphragm divides the cavity 64 into two variable volume chambers 70 and 72. In order to position the valve member and diaphragm when there is an equal pressure on either side of the diaphragm, I have provided a spring 74 within the variable volume chamber 72 between the lower walls thereof and the valve member by way of a spring retainer plate 76.

As seen, the aforementioned lower wall of the variable volume chamber 72 is provided with a return portion 78 that is centrally bored and provided with a valve seat 80 that cooperates with a valve poppet 82 biased by a spring 84 to normally rest thereagainst so as to close communication above chamber 72 from atmospheric pressure. This atmospheric pressure enters an area 86 immediately behind poppet 82 by virtue of the opening 88 in the control valve housing and the filter 90 leading to the area 86.

The control valve member 68 is provided with projection 92 that is axially bored as at 94, which axial bore also communicates with a radial bore 96 in the upper regions of the valve control member 68 so that normally, in the non-actuated position where the pressures on either side of diaphragms 66 are equal, the fluid pressure in chamber 70 is communicated to chamber 72. Adjacent the radial bore 96 I have provided a flange 98 on the control member 68 that cooperates with a central partition 58 to limit the upward travel of the valve control member 68. The chamber 70 is provided with an inlet 100; whereas, the chamber 72 is provided with an outlet 102.

The partition 58 is drilled as at 104 to communicate the pressure of chamber 70 to an intermediate chamber 106 that is divided out of cavity 62 by a flexible diaphragm 108 that is operatively mounted within the cavity. Above the diaphragm 108 I have also provided a variable volume chamber 110 which communicates by way of a passage 112 in partition 59 to the upper cavity 60 which is, in turn, provided with an inlet 114 that is connected by conduit 54, aforementioned, to the control chamber of the primary servomotor 10.

The diaphragm 108 is provided with a backing plate 116 that is centrally drilled to receive a rod 118 which is held to the backing plate 116 by a retaining ring 120. The diaphragm 108 is also provided with a central opening which is of smaller cross sectional diameter than the rod 118 and therefore arranged to seal the connection of the rod 118 with the backing plate 116. Underlying the backing plate 116 I have provided a constant rate spring 122 that is biased between a retaining plate 124 and the backing plate 116. The retaining plate 124 is held by link 126 to the control valve member 68 that is projected through the partition 58.

The rod 118 is affixed to a circular plate 128 which forms a bearing for a variable rate conical spring 130 that is biased between the partition 59 and the circular plate 128.

In operation, the operator of a vehicle will press upon the brake pedal 12 to create a pressure differential across the movable wall within the servomotor 10, such as by porting the control chamber 18 to atmosphere while maintaining the chamber 16 in a vacuum. The atmospheric pressure in chamber 18 is then communicated by conduit 54 to the upper chamber 60 and through passage 112 into the variable volume chamber 110. This will create a pressure differential across the diaphragm 108 in that the variable volume chamber 106 immediately underlying is communicated to the same vacuum that chamber 16 is in connection with by virtue of the inlet 100, the passage 104 and the partition 58. This pressure differential would have the effect of compressing both the variable rate conical spring 130 and the constant rate or coil spring 122. The immediate effect of the compression of both the aforementioned springs is to actuate the control valve member 68 to close off the axial passage 94 by abutment with the valve poppet 82. Upon further comression of the springs the valve poppet 82 is lifted off the seat 80 to communicate atmosphere by way of outlet 102 and conduit 48 to the control chamber 32 of the secondary servomotor 28 controlling the rear brakes 26. Thus, both the front brakes and the rear are actuated.

As the control pressure in chamber 18 is increased the variable rate conical spring is gradually going solid whereupon, as the larger diameter coils go solid, the spring rate changes due to a varying effective diameter; whereupon a greater pressure differential is required across the diaphragm 108 before further compression of spring 122 can be accomplished to provide further braking pressure to control chamber 32 of the secondary servomotor 28. In addition, as the control member 68 unseats the valve poppet 82 a pressure differential is created across the diaphragm 66 that will oppose further movement of the valve 68 to thereby assist the variable rate conical spring 130 in proportioning the amount of control pressure to the secondary servomotor 28.

It may be thus realized by those skilled in the art to which my invention relates that as the braking force increases to the front brakes the net effect of the valve 50 is to vary the braking force to the rear brakes, in accordance with a pressure condition. Furthermore, it is to be readily understood that I do not wish to be limited to a pneumatic system as disclosed, for it is well within the skill of the art to substitute pistons for the diaphragms and control a hydraulic pressure in a similar fashion to that by which the vacuum and atmosphere have been controlled in the preferred description which has been set forth above in order to comply with the applicable patent statutes. Therefore, in view of the wide scope of my contribution, I do not intende to be limited to the aforementioned description of the accompanying drawings; but rather to have my invention defined by the scope of the appended claims.

I claim:

1. A braking system for a vehicle having front and rear brakes comprising:

a first power brake servomotor including a first pressure responsive member dividing said servomotor into a pair of variable volume chambers one of which is a control chamber;

a control valve including a housing having a first and second movable diaphragm therein dividing said housing into first, second, third and fourth variable volume chambers with said first diaphragm between said first and second variable volume chambers being operatively connected to both said second diaphragm and said housing, said connection of said first diaphragm with said housing being in the form of a variable rate resistance means, said second pressure responsive means being connected to a valve plunger arranged for cooperation with a valve poppet to control communication of said third and fourth variable volume chambers, said housing having an inlet to said first variable volume chamber and another inlet to said third variable volume chamber with an outlet from said fourth variable volume chamber, said housing also including passages communicating said third and second variable volume chambers;

a conduit connecting said inlet to said first variable volume chamber with said control chamber of said first brake servomotor;

a second brake servomotor having a pair of variable volume chambers separated by a movable wall with one of said chambers being connected to a power source that is also connected to said first brake servomotor and the other of said chambers being connected by a conduit to the outlet from said fourth variable volume chamber of said second control valve means; and means connecting said first brake servomotor and said second brake servomotor to said front and rear brakes, respectively.

2. In a vehicle having a manually operated power brake servomotor for actuating a front wheel brake system thereof and including a secondary pressure responsive servomotor for actuating the rear brakes of said vehicle, a control means for said secondary servomotor comprising:

a first pressure responsive member operatively connected to a valve plunger to control the communication of power fluid to said secondary servomotor; and a second pressure responsive member operatively connected to said first pressure responsive member by a constant-rate spring, said second pressure responsive member being held against said constant-rate spring by a variable-rate spring which variable-rate spring is arranged to have increased spring modulus proportional to movement of said first pressure responsive member to vary the rate of increase of control pressure for said secondary servomotor as regards control pressure for said manually operated servomotor.

3. A control means according to claim 2 wherein said variable rate spring is characterized as a conical constant pitch spring whose coils are arranged to fit one within the other without touching as said spring is compressed to vary the effective area of said conical spring.

References Cited by the Examiner
UNITED STATES PATENTS

| | | | |
|---|---|---|---|
| 2,088,185 | 7/37 | Borde | 303—21 |
| 2,304,621 | 12/42 | Baade et al. | 303—7 |
| 2,305,638 | 12/42 | Rockwell | 303—31 X |
| 2,429,194 | 10/47 | Price | 303—31 X |
| 2,953,412 | 9/60 | Hill | 303—6 |

FERGUS S. MIDDLETON, *Primary Examiner.*